Jan. 15, 1957   A. R. UDEN   2,777,269
HEADER DRIVE ASSEMBLY FOR COMBINES
Filed Feb. 26, 1954   2 Sheets-Sheet 1

Allen R. Uden
INVENTOR.

Jan. 15, 1957  A. R. UDEN  2,777,269
HEADER DRIVE ASSEMBLY FOR COMBINES
Filed Feb. 26, 1954  2 Sheets-Sheet 2
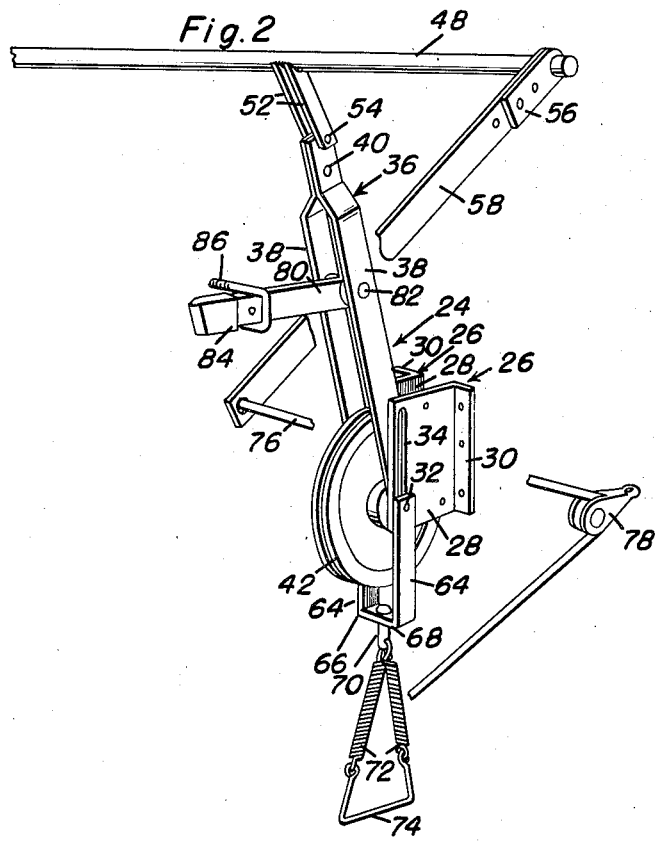
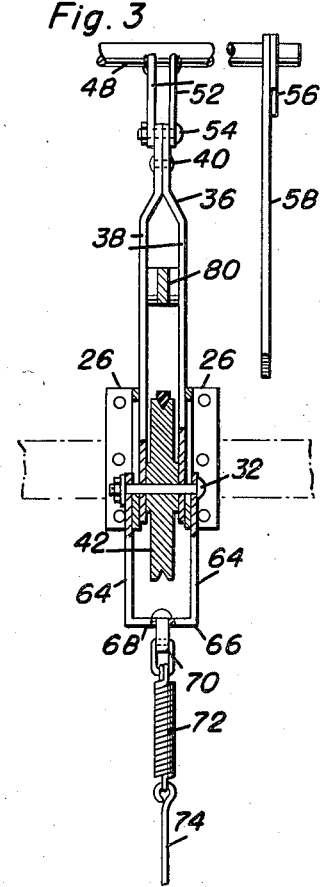
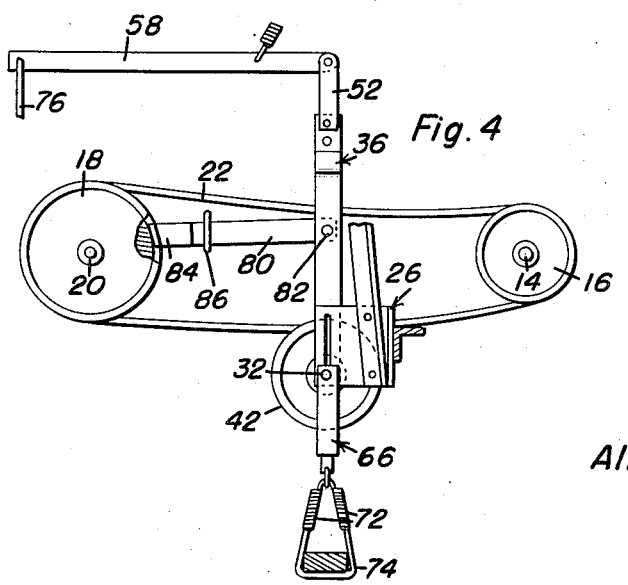
Allen R. Uden
INVENTOR.

United States Patent Office 2,777,269
Patented Jan. 15, 1957

2,777,269

HEADER DRIVE ASSEMBLY FOR COMBINES

Allen R. Uden, Matlock, Iowa

Application February 26, 1954, Serial No. 412,893

3 Claims. (Cl. 56—21)

This invention relates in general to improvements in farm equipment, and more specifically to a header and pick-up clutch for combines.

The drive assembly of a combine is of such a nature whereby it is necessary for the operator of the combine to stop the entire combine when it is desired to stop the header and the pick-up. It is therefore the primary object of this invention to provide a clutch in the drive train for the header in order that the operator of the combine may selectively stop the header without stopping the entire combine. By so providing a combine, many of the disadvantages of an ordinary combine are eliminated.

Another object of this invention is to provide an improved clutch which may be quickly and easily attached to a conventional combine for selectively operating the head of the pick-up of the combine independently of the remainder thereof.

A further object of this invention is to provide an improved brake which operates in unison with a clutch for a driven shaft of a combine which drives the header thereof whereby the driven shaft is immediately stopped from rotation upon the releasing of the drive therefor by the clutch.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a fragmentary perspective view of the pick-up clutch of Figure 1 and shows the same as it would appear independently of the combine for purposes of clarity;

Figure 1:
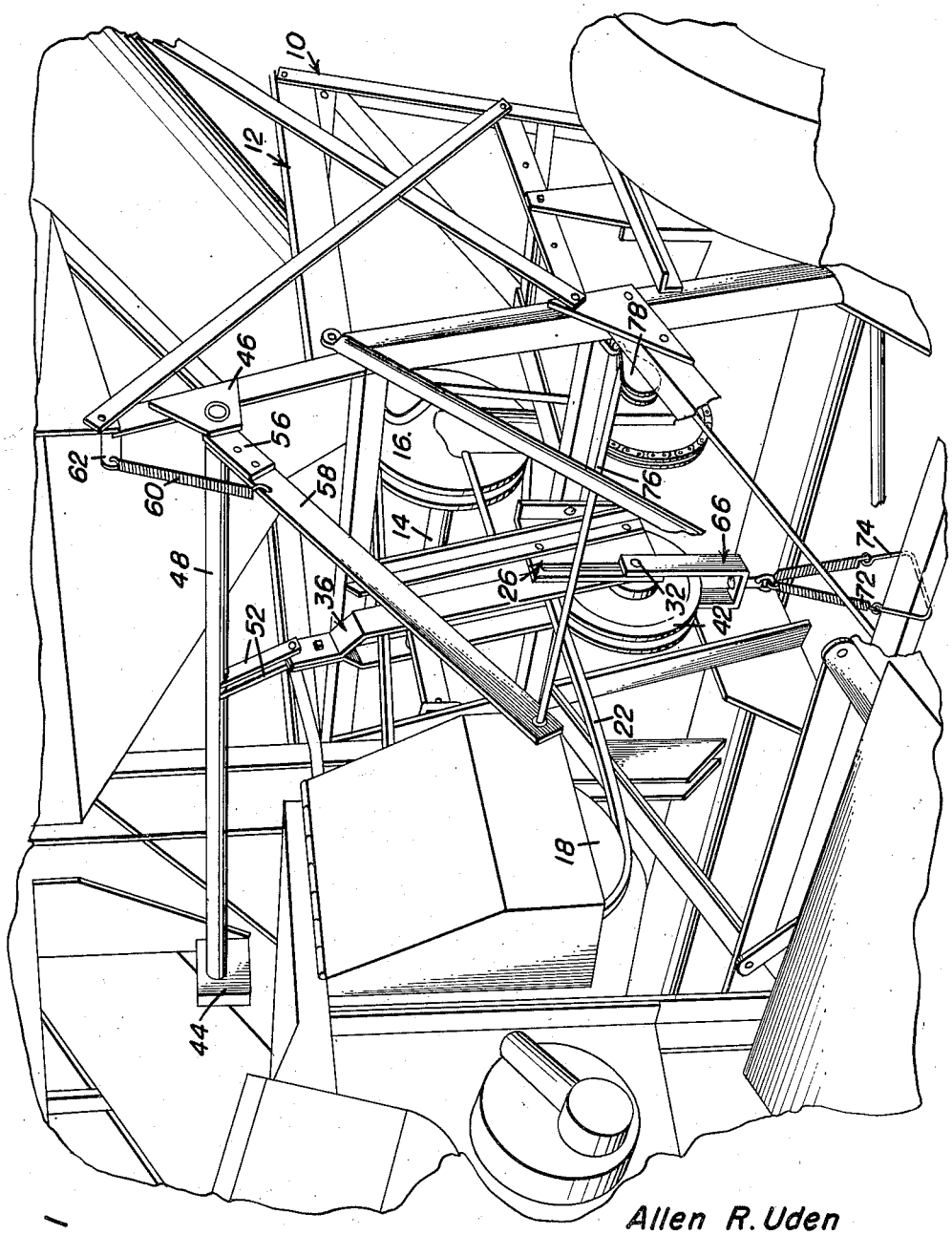
Figure 1 is a fragmentary perspective view of a combine having mounted thereon the header and pick-up clutch which is the subject of this invention and shows the clutch in a drive position.

Figure 3 is a fragmentary vertical sectional view taken along a vertical plane through the center of the lower portion of the pick-up clutch assembly and shows the general details thereof; and Figure 4 is a reduced side elevational view of the clutch and brake assembly with the conventional cover for the driven pulley having been removed, including a portion of the drive pulley broken away, and parts in section, and shows the relationship thereof with respect to a drive pulley and a driven pulley as well as a drive belt entrained over the two pulleys.

Referring now to the drawings in detail, it will be seen that there is illustrated in Figure 1 a portion of a combine which is referred to in general by the reference numeral 10. The combine 10 is a conventional combine now found on the market and disclosed in Patent No. 2,306,755. The combine 10 includes a frame construction which is referred to in general by the reference numeral 12. Carried by the frame construction 12 is the header (not shown) of the combine 12. Also carried by the frame 12 is a drive unit (not shown) of the combine 10. In order that the header may be driven by the drive unit, the combine 10 includes a cross shaft 14 which is suitably mounted in the frame 12. Carried by one end of the cross shaft 14 is a drive pulley 16. Disposed in longitudinal alignment with the drive pulley 16 is a driven pulley 18. The driven pulley 18 is mounted on a driven shaft 20, as seen in Figure 4, which is suitably connected to the header in the conventional manner and need not be explained in more detail here. Drivingly connecting the driven pulley 18 to the drive pulley 16 is a drive belt 22 which is entrained over the two pulleys. It is to be understood that the drive belt 22 is of a size so as to be normally loose if not otherwise tensioned so that the drive pulley 16 will not drive the driven pulley 18 through the drive belt 22 except when the drive belt 22 is tensioned.

As is best illustrated in all of the figures of the drawings, is the clutch assembly for use in combination with the header which is the subject of this invention being referred to in general by the reference numeral 24. The clutch assembly 24 includes a pair of guide members 26 which are disposed adjacent the lower span of the drive belt 22. Each of the guide members 26 includes a longitudinally extending plate portion 28 and a transversely extending mounting flange 30. The guide members 26 are mounted on the frame 12 through the use of the mounting flanges 30 with the longitudinal portions 28 in transversely spaced parallel relation. It is to be understood that the longitudinal plate portions 28 lie in vertical planes disposed on opposite sides of the drive belt 22.

Carried by the guide members 26 is a transversely extending pulley shaft 32 which has the ends thereof disposed in vertical slots 34 in the plate portions 28. Connected to the pulley shaft 32 is a generally vertically extending pulley shaft positioning member which is referred to in general by the reference numeral 36. The pulley shaft positioning member 36 is bifurcated and includes a pulley support member in the form of a pair of spaced parallel legs 38 which extend down between the plate portions 28 and which have the lower ends thereof connected to the pulley shaft 32. The upper ends of the legs 38 are connected together by suitable fasteners 40.

Carried by the pulley shaft 32 is an idler pulley 42. The idler pulley 42 is disposed between the legs 38 and is in vertical alignment with the drive belt 22, the lower span of the drive belt 22 passing over the top of the idler pulley 42.

As is best illustrated in Figure 1, carried by the frame 12 is a pair of transversely aligned mounting brackets 44 and 46. Rotatably journaled in the mounting brackets 44 and 46 are opposite ends of a transverse shaft 48. Carried by an intermediate portion of the transverse shaft 48 in angular alignment with the pulley shaft positioning member 36 and in angular relation to said shaft 48, are a pair of depending, spaced parallel links 52. The links 52 are disposed on opposite sides of the upper end of the pulley shaft positioning member 36 and are pivotally connected thereto by a transverse pivot pin 54.

In order that the shaft 48 may be utilized in the positioning of the pulley shaft positioning member 36 and the idler pulley 42, one end of the shaft 48 has rotatably secured thereon short bar 56 which has connected thereto a longitudinally extending operating lever 58. Connected to the operating lever 58 adjacent the short bar 56 is a lower end of a tension spring 60. The upper end of the tension spring 60 is connected to an ear 62 carried by the frame 12. The spring 60 urges the operating lever 58 to rotate in a clockwise direction, as viewed in Figures 1, 2 and 4, to cause links 52 and member 36 to tend to reach a straight line alignment which in effect increases the linear distance between shafts 48 and 32. Since the pulley shaft positioning member 36 is secured to shaft 32 of pulley 42, when links 52 and member 36 are in linear alignment as shown in Figure 4, for example, shaft 32 is in its lower position in slots 34. Inasmuch as idler pulley 42 has been moved with shaft 32 away from drive belt 22, there is attained the resultant loosening of the drive belt 22 so that the driven pulley 18 is disconnected from the drive pulley 16.

In order that the pulley shaft 32 may be properly retained within the slots 34, there is connected thereto upwardly extending legs 64 of a yoke which is referred to in general by the reference numeral 66. The legs 64 are disposed outwardly of the plate portions 28 and immediately adjacent thereto. The yoke 66 also includes a lower web 68 which has connected thereto through a pin 70, springs 72. The springs 72 have their lower ends connected to a U-shaped clip 74 which is clipped about a frame member of the frame 12. It will thus be seen that the springs 72 urge the idler pulley 42 downwardly in cooperation with the spring 60. However, it is to be understood that the spring 60 is much more powerful than the springs 72.

From the foregoing, it will be seen that the spring 60 normally retains the idler pulley 42 in a belt released position. In order that the clutch assembly 24 may be selectively operated to permit the tensioning of the drive belt 22 to an operative position, there is connected to the free end of the operating lever 58 one end of a flexible member 76. The flexible member 76 has an intermediate portion thereof entrained over a pulley 78 suitably carried by the frame 12 and extends from the pulley 78 to the operator's station (not shown) of the combine 10. By pulling on the flexible member 76, the operating lever 58 is moved in a counterclockwise direction, see Figure 4, to move the idler pulley 42 upwardly into engagement with the drive belt 22.

When the idler pulley 42 is moved downwardly to loosen the drive belt 22, the header and its associated driven pulley 18 has a tendency to continue rotating for a short period of time due to the inertia of the header. In order that this may be eliminated, there is provided a brake 80. The brake 80 has one end thereof disposed between the legs 38 of the pulley shaft positioning member 36 and is pivotally connected thereto by a transverse pivot pin 82. The brake 80 extends from the pulley shaft positioning member 36 toward the driven pulley 18 and has an end 84 thereof in alignment with the driven pulley 18. The brake 80 is supported in guided relation adjacent the end 84 by a U-shaped guide member 86 which is suitably carried by the frame 12.

Due to the angular relationship of links 52 and member 36, when they are urged into a linear relationship as previously explained, i. e. when idler pulley is out of engagement with belt 22, the brake 80 will have been moved longitudinally with its effective braking end 84 into engagement with pulley 20, and thus stop rotary movement of the shaft 20 and the header. Thus when the idler pulley 42 is released from the drive belt 22, the brake 80 simultaneously engages the driven pulley 18 to prevent rotation thereof. In this manner the rotation of the header is immediately stopped upon the actuating of the clutch assembly.

It should be apparent, see Figure 4, that when tension is applied to the flexible member 76, resulting in upward movement of member 36, the brake 80 and its effective end portion 84 will be moved away from pulley 20 permitting the free rotation thereof by the drive pulley 16.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination with a combine including a power unit, a driven shaft for driving a header and a pick-up, a drive shaft connected to said power unit, and pulleys on said driven shaft and said drive shaft drivingly interconnected by a drive belt requiring tension thereon to drive said driven pulley and driven shaft; a remotely controllable clutch assembly, said clutch assembly including guide members having elongated slots therein normal to one span of the belt, an idler pulley shaft disposed in said slots, an idler pulley carried by said idler pulley shaft, an idler pulley shaft positioning member normal to one span of said belt, one end of said positioning member being carried by said shaft for slidable and pivotable movement relative to said guide members, spring urged means operatively connected to said idler pulley shaft for retaining said idler pulley in a belt released position, operating means connected to the other end of said positioning member for overriding said spring urged means whereby said idler pulley will be moved in a direction normal to one span of the belt to a belt tensioning position, and a brake attached to said positioning member intermediate the ends thereof, said brake being engaged with the driven pulley when said idler pulley is in a belt released position.

2. In combination with a combine including a power unit, a driven shaft for driving a header and a pick-up, a drive shaft connected to said power unit, and pulleys on said driven shaft and said drive shaft drivingly interconnected by a drive belt requiring tension thereon to drive said driven pulley and driven shaft; a remotely controllable clutch assembly, said clutch assembly including guide members having elongated slots therein normal to one span of the belt, an idler pulley shaft disposed in said slots, an idler pulley carried by said idler pulley shaft, an idler pulley shaft positioning member normal to one span of said belt, one end of said positioning member being carried by said shaft for slidable and pivotable movement relative to said guide members, spring urged means operatively connected to said idler pulley shaft for retaining said idler pulley in a belt released position, operating means connected to the other end of said positioning member for overriding said spring urged means whereby said idler pulley will be moved in a direction normal to one span of the belt to a belt tensioning position, and a brake attached to said positioning member intermediate the ends thereof, said brake being engaged with the driven pulley when said idler pulley is in a belt released position, said brake being pivotally attached to said positioning member and a brake guide member supporting said brake in guided relation relative to said driven pulley.

3. In combination with a combine including a power unit, a driven shaft for driving a header and a pick-up, a drive shaft connected to said power unit, and pulleys on said driven shaft and said drive shaft drivingly interconnected by a drive belt requiring tension thereon to drive said driven pulley and driven shaft; a remotely controllable clutch assembly, said clutch assembly including guide members having elongated slots therein normal to one span of the belt, an idler pulley shaft disposed in said slots, an idler pulley carried by said idler pulley shaft, an idler pulley shaft positioning member normal to one span of said belt, one end of said positioning member being carried by said shaft for slidable and pivotable movement relative to said guide members, spring urged means operatively connected to said idler pulley shaft for retaining said idler pulley in a belt released position, operating means connected to the other end of said positioning member for overriding said spring urged means whereby said idler pulley will be moved in a direction normal to one span of the belt to a belt tensioning position, and a brake attached to said positioning member intermediate the ends thereof, said brake being engaged with the driven pulley when said idler pulley is in a belt released position, a spring attached to said operating means for returning said operating means to a belt released position.

References Cited in the file of this patent

UNITED STATES PATENTS

| | | |
|---|---|---|
| 1,820,570 | Krause | Aug. 25, 1931 |
| 1,956,766 | Jordan | May 1, 1934 |
| 2,033,603 | Anderson | Mar. 10, 1936 |
| 2,306,755 | Ronning | Dec. 29, 1942 |
| 2,524,083 | Ronning | Oct. 3, 1950 |